(12) United States Patent
Eastlake, III (10) Patent No.: US 9,473,318 B2
(45) Date of Patent: Oct. 18, 2016

(54) DYNAMIC MULTI-DESTINATION ADDRESSING

(71) Applicant: Futurewei Technologies, Inc., Plano, TX (US)

(72) Inventor: Donald E. Eastlake, III, Milford, MA (US)

(73) Assignee: Futurewei Technologies, Inc., Plano, TX (US)

( * ) Notice: Subject to any disclaimer, the term of this patent is extended or adjusted under 35 U.S.C. 154(b) by 120 days.

(21) Appl. No.: 14/274,510

(22) Filed: May 9, 2014

(65) Prior Publication Data

US 2014/0334373 A1 Nov. 13, 2014

Related U.S. Application Data

(60) Provisional application No. 61/822,175, filed on May 10, 2013.

(51) Int. Cl.
*H04L 12/18* (2006.01)

(52) U.S. Cl.
CPC .................................. *H04L 12/189* (2013.01)

(58) Field of Classification Search
CPC ..... H04L 12/189; H04L 12/56; H04L 12/26; H04L 12/28
USPC ........................................................ 370/312
See application file for complete search history.

(56) References Cited

U.S. PATENT DOCUMENTS 5,511,168 A * 4/1996 Perlman ................ H04L 12/185
370/409
6,625,773 B1 * 9/2003 Boivie .................. H04L 1/1607
370/400

(Continued)

FOREIGN PATENT DOCUMENTS

EP 1059764 A2 12/2000

OTHER PUBLICATIONS

"Draft Standard Telecommunications and Information Exchange Between Systems—Local and Metropolitan Area Networks—Part 11: Wireless LAN Medium Access Control (MAC) and Physical Layer (PHY) Specifications—Amendment <tbd>: Enhancements for Transit Links Within Bridged Networks," P802.11ak/DO.01, IEEE, Mar. 2014, 51 pages.

(Continued)

*Primary Examiner* — Chi H Pham
*Assistant Examiner* — Robert Lopata
(74) *Attorney, Agent, or Firm* — Conley Rose, P.C.; Grant Rodolph; William H. Dietrich (57) ABSTRACT

A network component that processes or sends multi-destination frame via a wireless radio link. In one example embodiment, the network component may receive the multi-destination frame that comprises a control block type, a receiver list, and one or more data packets in a wireless radio network. The network component may determine the control block type and the receiver list from the multi-destination frame. The receiver list may reference a plurality of receivers and the control block type may indicate a type of receiver list. The network component may receive one or more data frames. In another example embodiment, the network component may generate a multi-destination frame that comprises the control block type, a receiver list associated with the control block type, a header, and the one or more data frames and send the multi-destination frame to a plurality of receivers.

19 Claims, 4 Drawing Sheets

(56) References Cited

U.S. PATENT DOCUMENTS

| | | | |
|---|---|---|---|
| 7,346,699 B1* | 3/2008 | Krause | G06F 9/544 709/224 |
| 2004/0158872 A1* | 8/2004 | Kobayashi | H04L 12/1886 725/120 |
| 2005/0286455 A1 | 12/2005 | Fernandes et al. | |
| 2006/0159096 A1 | 7/2006 | Gershinsky et al. | |
| 2006/0262794 A1* | 11/2006 | Livet | H04W 28/06 370/390 |
| 2007/0091918 A1* | 4/2007 | Luo | H04L 12/1827 370/465 |
| 2007/0201468 A1* | 8/2007 | Jokela | H04L 12/18 370/390 |
| 2009/0059935 A1* | 3/2009 | Dec | H04L 12/185 370/401 |
| 2009/0080352 A1* | 3/2009 | Yoneda | H04L 12/189 370/312 |
| 2010/0046516 A1 | 2/2010 | Fernandez | |
| 2011/0019673 A1* | 1/2011 | Fernandez Gutierrez | H04L 12/185 370/390 |
| 2011/0058551 A1* | 3/2011 | Fernandez Gutierrez | H04L 12/185 370/390 |
| 2011/0069620 A1* | 3/2011 | Gintis | H04L 12/2697 370/250 |
| 2011/0096710 A1* | 4/2011 | Liu | H04L 1/1614 370/312 |
| 2011/0116435 A1* | 5/2011 | Liu | H04L 1/1664 370/312 |
| 2011/0149960 A1* | 6/2011 | Fernandez Gutierrez | H04L 12/18 370/390 |
| 2012/0120845 A1* | 5/2012 | Perras | H04W 4/08 370/254 |
| 2015/0271791 A1* | 9/2015 | Webb | H04W 4/005 370/230 |
| 2015/0312953 A1* | 10/2015 | Wang | H04L 1/00 370/312 |

OTHER PUBLICATIONS

Finn, "Problem List for P802.1Qbz/P802.11ak Point-to-Point Model," Version 2, bz-nfinn-to-pt-problem-list-1112-v02.pdf, Cisco, Dec. 2012, 42 pages.

"IEEE Standard for Ethernet," IEEE Computer Society, IEEE Standard 802.3-2012, Section 1, Dec. 28, 2012, 634 pages.

"IEEE Standard for Local and Metropolitan Area Networks—Virtual Bridged Local Area Networks-Bridge Port Extension," IEEE Standard 802.1BR-2012, Jul. 16, 2012, 135 pages.

"IEEE Standard for for Information Technology—Telecommunications and Information Exchange Between Systems—Local and Metropolitan Area Networks—Specific Requirements. Part 11: Wireless LAN Medium Access Control (MAC) and Physical Layer (PHY) Specifications," IEEE Computer Society, IEEE Standard 802.11-2012, Mar. 29, 2012, 2793 pages.

Foreign Communication From A Counterpart Application, PCT Application No. PCT/US2014/037562, International Search Report dated Aug. 19, 2014, 5 pages.

Foreign Communication From A Counterpart Application, PCT Application No. PCT/US2014/037562, Written Opinion dated Aug. 19, 2014, 7 pages.

* cited by examiner

DYNAMIC MULTI-DESTINATION ADDRESSING

CROSS-REFERENCE TO RELATED APPLICATIONS

The present application claims benefit of U.S. Provisional Patent Application No. 61/822,175 filed May 10, 2013 by Donald E. Eastlake and entitled, "Wi-Fi Multicast Receiver Individualization," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many bridging protocols, such as Rapid Spanning Tree Protocol, may be designed to work on point-to-point (p2p) links. In Ethernet networks, such links may be "full duplex" which means there are two p2p channels between a transmitter and a receiver. The station at the ends of the link may be transmitters for one channel and receivers for the other. However, some physical media, such as wireless systems or the use of power lines for data, may inherently be broadcast type media, in which many stations receive the transmission. A broadcast type media may implement a point-to-multipoint (p2 mp) transmission, as opposed to a p2p media where each transmitter is paired with exactly one receiver.

Some multi-access media select a designated station such that stations can communicate with the designated station, but non-designated stations may not be able to communicate with each other. Thus, for reliable receipt of a broadcast message originating at a non-designated station, for example, the message may be unicast to the designation station, which then broadcasts it to other stations. An Access Point (AP) configured to implement an Institute for Electrical and Electronics Engineers (IEEE) 802.11 protocol (e.g., Wi-Fi) is an example of such a designated station. A large number of products including home entertainment systems and industrial control equipment that have both an IEEE 802.11 wireless station capability and a wired IEEE 802.3 Ethernet capability. IEEE 802.11 has a media operating in the gigabit per second range and has standardized security and quality of service improvements. As such, IEEE 802.11 links may be used as transit links inside a wireless network, and not just as a path to an end station at the end of a network. Additional information for an IEEE 802.11 wireless network may be as described in the IEEE 802.11 standard titled, "Part 11: Wireless local area network (LAN) Medium Access Control (MAC) and Physical Layer (PHY) Specifications," and additional information for an Ethernet network may be as described in the IEEE 802.3 standard titled, "IEEE Standard for Ethernet," both of which are hereby incorporated by reference as if reproduced in their entirety.

Transmitting multi-destination frames from an AP using the communication between an IEEE 802.11 AP and its associated station as a set of p2p transit link may be challenging. For example, when implementing a spanning tree or the like, an arbitrary sub-set of stations may receive the frame and the frame may not be sent back to the sender (e.g., reflection problem). Also, the frame may comprise different virtual local access networks (VLAN) identifier and/or other tagging identifiers to forward the frame to different stations. Some conventional networks may broadcast messages as a sequence of unicast messages to their intended recipients. However, the broadcast link may be blocked for other transmissions during each of the multiple unicast transmissions, which may result in significant channel blocking. Other conventional systems may use a designated station on a broadcast media link to configure other stations on that broadcast link by sending commands to other stations so as to control which other stations should receive messages. This may require a protocol between the designation station and every other station so that the designation station can receive confirmation that such commands were correctly received and have taken effect. Otherwise, the behavior of a station may be uncertain and transmissions to the station may need to be delayed or handled differently. Other conventional networks may use an encoded address label to address the intended recipients, but this may limit the number of addressable receivers.

SUMMARY

In one example embodiment, the disclosure includes a network component to process a multi-destination frame. The network component may receive the multi-destination frame that comprises a control block type, a receiver list, and one or more data packets in a wireless radio network connection. The network component may obtain the control block type and the receiver list from the multi-destination frame. The receiver list may reference a plurality of receivers and the control block type may indicate a type of receiver list.

In another example embodiment, the disclosure includes a network component to process a multi-destination frame. The network component may obtain a multi-destination frame that comprises an aggregate header, a control block, and one or more data frames using a wireless radio network connection. The network component may determine a control block type and a receiver list from the multi-destination frame. The network component may process the multi-destination frame based on the control block type and the receiver list. The control block type may indicate that the receiver list is an include list or an exclude list. The receiver list may reference a plurality of receivers.

In yet another example embodiment, the disclosure includes a network component to send a multi-destination frame using a wireless radio link. The network component may receive one or more data frames to communicate to a plurality of receivers. The network component may generate a multi-destination frame that comprises the control block type, a receiver list associated with the control block type, an aggregate frame header, and the one or more data frames. The control block type may indicate that the receiver list is an include list or an exclude list. The receiver list may reference a plurality of receivers. The network component may send the multi-destination frame to a plurality of receivers.

BRIEF DESCRIPTION OF THE DRAWINGS

For a more complete understanding of this disclosure, reference is now made to the following brief description.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for selectively addressing receivers when communicating multi-destination data packets, frames, messages, or the like, and processing aggregate multi-destination data packets. Multi-destination packets include broadcast messages, intended to reach all stations on a link except the sender, and multicast messages, intended to reach a designated subset of stations on the link not including the sender. A multi-destination frame may be communicated to a plurality of receivers that may partially process the multi-destination frame to determine further processing instructions. The multi-destination frame may comprise a list of stations that may accept the transmission or a list of stations that may not accept the transmission. Additional information (e.g., tagging information) for one or more receivers may be encoded and/or communicated using the multi-destination frame. The amount of air time used to communicate with a plurality of receivers may be reduced by using such a multi-destination frame.

Figure 1:
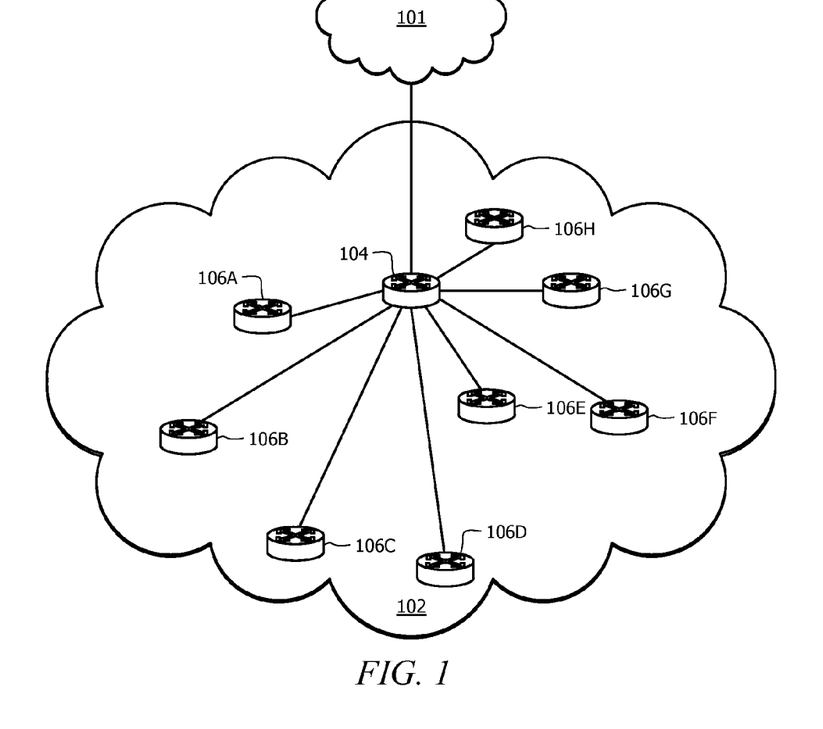
FIG. 1 is a schematic diagram of an example embodiment of a network system.

FIG. 1 is a schematic diagram of an example embodiment of a network system 100. The network system 100 may generally comprise a network 101 coupled to a network 102. The network 101 may be a wide area network (WAN) or a local area network (LAN). The network 102 may be a LAN. The data traffic may be communicated using wired and/or wireless links between the network 101 and the network 102. The network 102 may comprises a transmitting node 104 and a plurality of receiving nodes 106A-106H. In one example embodiment, the network 102 may be a wireless network configured to support wireless data communication between a transmitting node 104 and receiving nodes 106A-106H. Specifically, the network 102 may be a Wi-Fi network, a radio network, a Bluetooth network, a zigbee network, or any other suitable radio based network as would be appreciated by one of ordinary skill in the art upon viewing this disclosure. In an example embodiment, network 102 may be an IEEE 802.11ak network. Additional information for an IEEE 802.11ak network may be as described in IEEE P802.11/D0.01 titled, " . . . . Part 11: Wireless LAN Medium Access Control (MAC) and Physical Layer (PHY) Specifications, Amendment . . . . Enhancements For Transit Links Within Bridged Networks," which is hereby incorporated by reference as if reproduced in its entirety.

The transmitting node 104 and the receiving nodes 106A-106H may be any device or components that support the transportation of data traffic (e.g., data packets) through the network 102. For example, the transmitting node 104 and the receiving nodes 106A-106H may include a switch, a router, an AP, an AP station, a user-equipment, a mobile communications device, and any other suitable network device for communicating data packets as would be appreciated by one of ordinary skill in the art upon viewing this disclosure, or combinations thereof. The transmitting node 104 may be configured to receive data traffic (e.g., data packets) from the network 101 and/or a network node, to establish a wireless connection with one or more receiving nodes 106A-106H, and to communicate data traffic with each of the receiving nodes 106A-106H. The connection between the transmitting node 104 and a receiving node 106A-106H may simulate a virtual port between the transmitter node 104 and one or more of the receiving nodes 106A-106H. The data traffic may be communicated using wireless links between the transmitting node 104 and each of the receiving nodes 106A-106H. In one example embodiment, the receiving nodes 106A-106H may not be configured to communicate with other receiving nodes 106A-106H. Alternatively, one or more of the receiving nodes 106A-106H may be able to communicate with other receiving nodes 106A-106H. In an example embodiment, the transmitting node 104 may be an IEEE 802.11ak AP and the receiving nodes 106A-106H may comprise a combination of IEEE 802.11ak AP stations and non-802.11ak AP stations. Non-802.11ak AP stations may not accept a multi-destination frame and may drop the frame. An AP that supports IEEE 802.11ak may implement IEEE 802.11ak when sending to IEEE 802.11ak AP stations that drop any non-802.11ak multi-destination messages.

Using FIG. 1 as an example, the transmitting node 104 may receive data traffic from the network 101. The transmitting node 104 may generate a multi-destination frame that comprises a list of receiving nodes 106A-106H that may process the multi-destination frame and the data traffic. The transmitting node 104 may transmit the multi-destination frame to the receiving nodes 106A-106H. The receiving nodes 106A-106H may process (e.g., partially process) the multi-destination frame using the list of receiving nodes 106A-106H to determine whether to further process the multi-destination frame or to discard the multi-destination frame.

As persons of ordinary skill in the art may appreciate, although FIG. 1 illustrates a network system 100 with that comprises a network 101, a network 102, a single transmitting node 104, and a plurality of receiving nodes 106A-106H, the disclosure is not limited to only this specific application. For instance, the network system 100 may comprise a plurality of networks, a plurality of transmitting nodes 104 and any suitable number of receiving nodes 106A-106H. The transmitting node 104 and the receiving nodes 106A-106H may be interconnected amongst each other to form a plurality of different network topologies. The use and discussion in FIG. 1 is only an example to facilitate ease of description and explanation. Furthermore, throughout the disclosure the term "multi-destination frame" and "aggregate frame" may be used interchangeably to describe a data frame that may address and comprise data content for a plurality of receiving nodes (e.g., receiving nodes 106A-106H).

Figure 2:
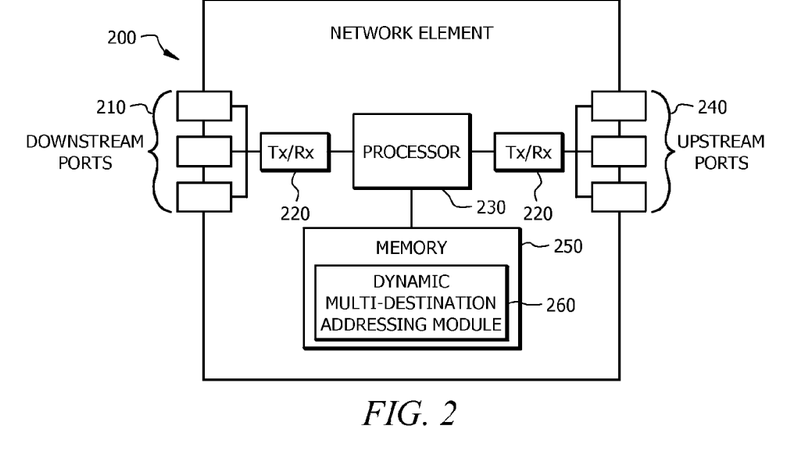
FIG. 2 is a schematic diagram of an example embodiment of a network element.

FIG. 2 is a schematic diagram of an example embodiment of a network element 200 that may be used to transport and process traffic through at least a portion of a network system 100 shown in FIG. 1. At least some of the features/methods described in the disclosure may be implemented in a network element. For instance, the features/methods of the disclosure may be implemented in hardware, firmware, and/or software installed to run on the hardware. The network element 200 may be any device (e.g., an access point, an access point station, a server, a client, a user-equipment, a mobile communications device, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one example embodiment, the network element 200 may be an apparatus configured to implement dynamic multi-destination addressing and/or to establish and communicate data traffic via a radio based connection (e.g., Wi-Fi). For example, network element 200 may be or incorporated within transmitting node 104 or a receiving node (e.g., receiving nodes 106A-106H) as described in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another example embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to communicate and/or process multi-destination frames.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise a dynamic multi-destination addressing module 260 that may be implemented on the processor 230. In one example embodiment, the dynamic multi-destination addressing module 260 may be implemented on a transmitting node to generate and/or communicate an aggregate frame which selectively addresses a plurality of receiving nodes for a multi-destination data transmission. In another example embodiment, the dynamic multi-destination addressing module 260 may be implemented on a receiving node to process an aggregate frame.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
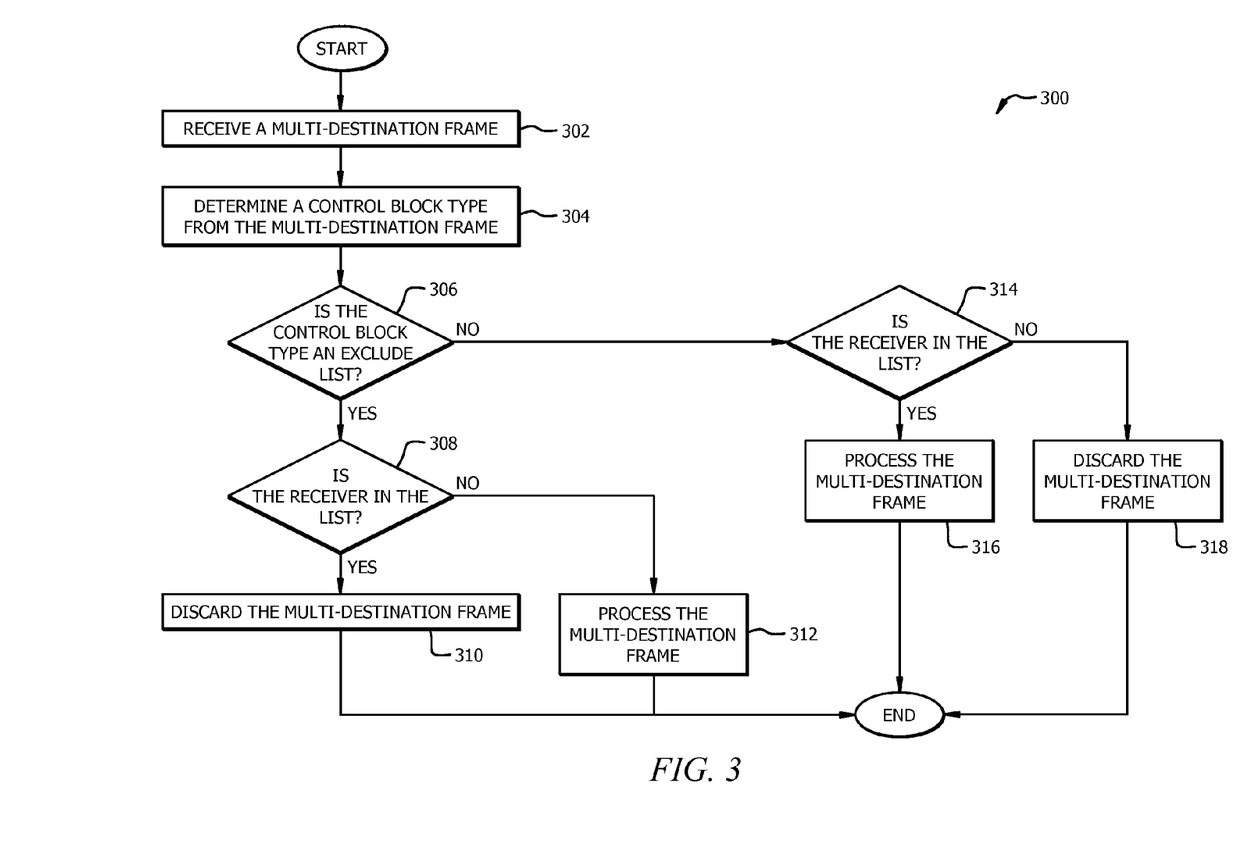
FIG. 3 is a flowchart of an example embodiment of a dynamic multi-destination addressing method.

FIG. 3 is a flowchart of an example embodiment of a dynamic multi-destination addressing method 300. In an example embodiment, method 300 may be implemented on a receiver (e.g., receiver nodes 106A-106H as described in FIG. 1) that support IEEE 802.11ak to process a multi-destination frame (e.g., aggregate frame 500 as will be discussed in FIG. 5). At step 302, method 300 may receive a multi-destination frame from a transmitting node (e.g., transmitting node 104). At step 304, method 300 may process a control block (e.g., control block 504 as will be discussed in FIG. 5) of the multi-destination frame to determine a control block type. A control block type may describe a relationship between a list of receivers and the data content within the multi-destination frame. Specifically, the control block type may describe whether the receivers that are identified by the control block may accept or discard the multi-destination frame. A control block may be processed by parsing a control block header (e.g., control block header 602 as will be discussed in FIG. 6) and/or a control block data (e.g., control block data 604 as will be discussed in FIG. 6) to extract information.

At step 306, method 300 may parse the control block header 602 and using information obtained from the control block header 602 may determine whether the control block type is an exclude list. The control block header 602 may comprise one or more fields (e.g., a flag field) that may indicate a control block type by using flag bits or numerical values associated with various control block types. If the control block type is an exclude list, then method 300 may proceed to step 308, otherwise, method 300 may proceed to step 314. At step 308, method 300 may determine if the receiver is in the receiver list. Using FIG. 1 as an example, a receiver list may comprise receiving nodes 106A-106D and not include receiving nodes 106E-106H. Alternatively, the receiving list may reference any number and/or combination of receiving nodes 106A-106H. Method 300 may parse and extract information from the control block to determine if the receiver is identified in the receiver list (e.g., an association identifier (AID) item 614 as will be discussed in FIG. 6) in the control block. If the receiver is in the receiver list, then method 300 may proceed to step 310, otherwise, method 300 may proceed to step 312. At step 310, method 300 may discard the multi-destination frame and may terminate.

Returning to step 308, if the receiver is not in the receiver list, then method 300 may proceed to step 312. At step 312, method 300 may process the multi-destination frame and may terminate. Method 300 may process the multi-destination frame by extracting and/or using the one or more data frames within the multi-destination frames. The data content of the data frames may be stored, used, displayed, communicated to other network devices, any other operation as would be appreciated by one of ordinary skill in the art upon viewing this disclosure, or combinations thereof. Additionally, method 300 may parse and extract tagging information associated with the receiver. Method 300 may generate and/or communicate a data packet that comprises the tagging information and one or more of the data frames.

Returning to step 306, if the control block type is not an exclude list (e.g., an include list), method 300 may proceed to step 314. At step 314, method 300 may parse and extract information from the control block to determine if the receiver is in the receiver list. Method 300 may implement step 314 in a manner substantially similar to step 308, as previously discussed. If the receiver is in the receiver list, then method 300 may proceed to step 316, otherwise, method 300 may proceed to step 318. At step 316, method 300 may process the multi-destination frame and may terminate. Method 300 may implement step 316 in a manner substantially similar to step 312, as previously discussed. Returning to step 314, if the receiver is not in the receiver list, then method 300 may discard the multi-destination frame and may terminate.

Figure 4:
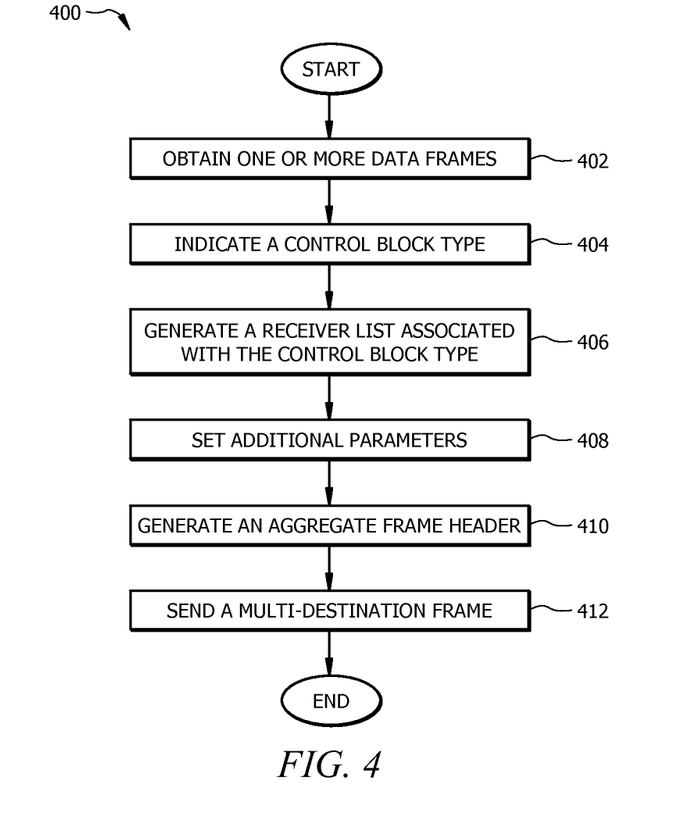
FIG. 4 is a flowchart of another example embodiment of a dynamic multi-destination addressing method.

FIG. 4 is a flowchart of another example embodiment of a dynamic multi-destination addressing method 400. In an example embodiment, method 400 may be implemented on a transmitter (e.g., a transmitting node 104 as described in FIG. 1) to selectively address receivers when communicating multi-destination data packets. At step 402, method 400 may obtain one or more data frames. Method 400 may generate and/or receive one or more data frames to communicate to one or more receivers. The data frames may carry data content for the one or more receivers. At step 404, method 400 may indicate a control block type in a control block header. Method 400 may set one or more flag bit or a numerical value in the control block headers (e.g., in a flag field) to indicate a desired control block type. Method 400 may generate and/or attach a control block to the data frames. In one example embodiment, the control block type may be configured as an include list. In another example embodiment, the control block type may be configured as an exclude list.

At step 406, method 400 may generate a receiver list associated with the control block type. Method 400 may generate a list, a table, or the like, that identifies one or more receivers. The receivers may each be identified by an AID, an Internet Protocol (IP) address, a Media Access Control (MAC) address, a tag, or any other suitable identifier as would be appreciated by one of ordinary skill in the art upon viewing this disclosure. Method 400 may generate and/or attach one or more AID items to the control block and data frames. The AID items may comprise a list of receivers that corresponds with receiver type list indicated by the control block. When the control block type is configured as an include list, the AID items may be a list of receivers that may process the received data packet. When the control block type is configured as an exclude list, the AID item may be a list of receivers that may discard the received data packet.

Optionally, at step 408, method 400 may set additional parameters within a control block. Method 400 may set one or more additional parameters, such as indicating that tagging information is available. Method 400 may configure the data packet to provide the tagging information. The tagging information may be a VLAN identifier (VID), a priority indicator, or any other suitable tag as would be appreciated by one of ordinary skill in the art upon viewing this disclosure. Method 400 may provide a default tag and/or other tags. One or more flag bits may be set to indicate tagging instructions. At step 410, method 400 may generate an aggregate frame header. Method 400 may generate and/or attach an aggregate header to the AID items, the control block, and the data frames, and thereby generate a multi-destination frame. At step 412, method 400 may send the multi-destination frame that comprises the aggregate header, the AID items, the control block, and the data frames to a plurality of receivers.

Figure 5:
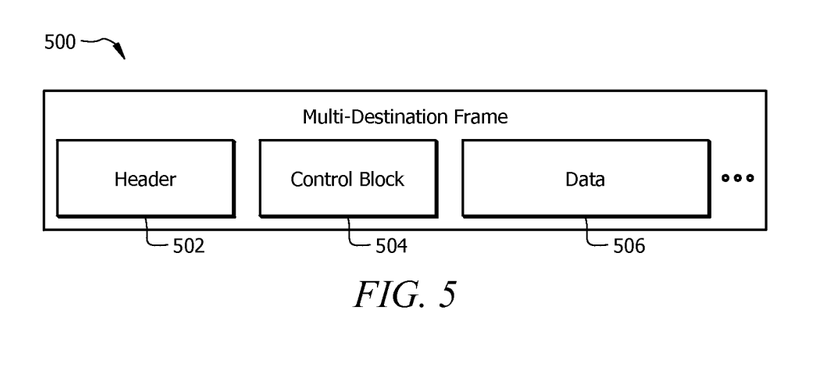
FIG. 5 is a schematic diagram of an example embodiment of a multi-destination frame.

FIG. 5 is a schematic diagram of an example embodiment of a multi-destination frame 500. The multi-destination frame 500 may be a data frame and may generally comprise a header 502, one or more control blocks 504, and data 506. The header 502 may indicate that the data packet is a multi-destination (e.g., multicast) frame. A receiving node (e.g., a legacy receiver) that is not configured to support the control block, an exclude or include receiver list, header 502, and/or the multi-destination frame 500 may discard packets that comprise the header 502 without further processing of the multi-destination frame 500. The control block 504 may comprise instructions or information for processing (e.g., further processing) the multi-destination frame 500, such as a list of receivers that may process the multi-destination frame 500, a list of receivers that may not process the multi-destination frame 500, one or more receiver identifiers, and tagging information. The data 506 may comprise data content or a payload. Alternatively, in an aggregated data frame the data may comprise one or more data frames comprising data content or a payload for a plurality of receiving nodes (e.g., receiving node 106A-106H). The aggregated data frame embodiment will be discussed in more detail in FIG. 6

Figure 6:
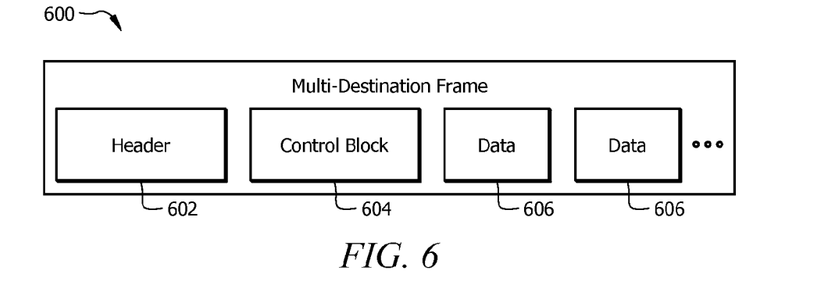
FIG. 6 is a schematic diagram of another example embodiment of a multi-destination frame.

FIG. 6 is a schematic diagram of another example embodiment of a multi-destination frame 600. The multi-destination frame 600 may be an aggregate data frame (e.g., a media access control (MAC) service data unit (MSDU), an aggregated-MSDU (A-MSDU), a MAC protocol data unit (MPDU), an aggregate-MPDU (A-MPDU), or an IEEE 802.11ak frame) and may generally comprise a header 602, one or more control blocks 604, and a plurality of data 606. The header 602 and/or the control block 604 may be similar to header 502 and control block 504 as discussed in FIG. 5. The data 606 may comprise a plurality of data frames comprising data content or a payload for a plurality of receiving nodes (e.g., receiving node 106A-106H).

Figure 7:
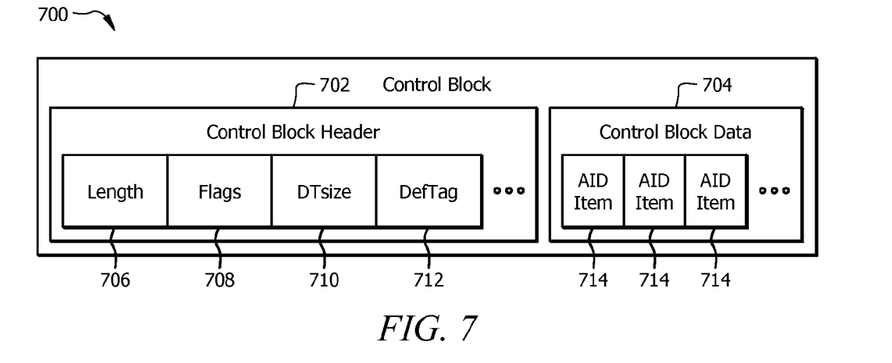
FIG. 7 is a schematic diagram of an example embodiment of a control block.

FIG. 7 is a schematic diagram of an example embodiment of a control block 700. In an example embodiment, the control block 700 may comprise a control block header 702 and a control block data 704 appearing in an aggregate frame. The control block header 702 may comprise a length field 706, a flags field 708, a default size (DTsize) field 710, and a default tag (DefTag) field 712. The length field 706 may be about 16 bits and may indicate the length (e.g., in bytes) of control block 700. The flags field 708 may be about 24 bits and may indicate a control block type. The control block type may be a sub-setting exclusion list (e.g., an exclude list), a sub-setting inclusion list (e.g., an include list), sub-setting inclusion with prefix data list, or a vendor specific list. An include list may indicate that a corresponding list of receivers may process a multi-destination frame (e.g., multi-destination frame 500 in FIG. 5). An exclude list may indicate that a corresponding list of receivers may discard the multi-destination frame. A sub-setting inclusion with prefix data list may indicate that a corresponding list of receivers may process a multi-destination frame using prefix data (e.g., tagging information). A vendor specific type may indicate any control information used to process the multi-destination frame. In an example embodiment, one of the flag bits (e.g., the top bit) in the flags field 708 may be a first value (e.g., set to zero) and may indicate the control block type is an include list. Alternatively, the flag bit (e.g., the top bit) in the flags field 708 may be a second value (e.g., set to one) and may indicate the control block type is an exclude list. The DTsize field 710 may be about eight bits and may indicate the size (e.g., in bytes) of the DefTag field 712. The DefTag field 712 may be about 32 bits and may indicate a default tag that may be used when tagging information is unavailable. The control block data 704 may comprise one or more AID items 714. An AID item 714 may be a block that comprises one or more entries about 16 bits in length and may identify a receiver and/or a peering relationship between a sender and the receiver.

In another example embodiment, the control block 700 may comprise a control block header field, a control block data field, and a padding field. The control block header field may be about two octets and may comprise a "more control block" field, a control block type field, and a control block data length field. The "more control block" field may be a one bit flag and may indicate the presence of additional control blocks when a multi-destination frame (e.g., an aggregate multi-destination frame) comprises a plurality of control blocks. For example, the "more control block" field may be a first value (e.g., set to zero) to indicate that the control block is the last control block and may be a second value (e.g., set to one) to indicate that the control block is followed by another control block. The control block type may be about five bits and may indicate the control block type (e.g., sub-setting exclusion, sub-setting inclusion, sub-setting inclusion with prefix data, or vendor specific). The control block data length field may be about ten bits and may indicate the length (e.g., in bytes) of the control block data field. The control block data field may be up to 1023 octets and may contain data content (e.g., AID items 714). The padding field may be up to about three octets and may pad the control block to such that the length of every control block is a multiple of four octets.

Figure 8:
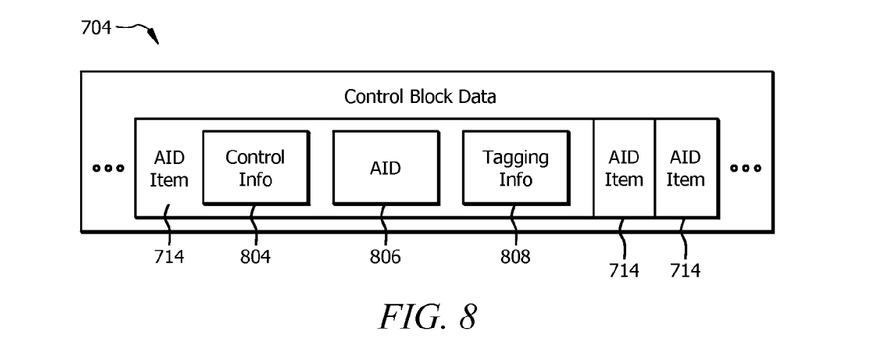
FIG. 8 is a schematic diagram of an example embodiment of control block data.

FIG. 8 is a schematic diagram of another example embodiment of control block data 704. The control block data 704 may comprises one or more AID items 714. An AID item 714 may comprise a control info field 804, an AID field 806, and a tagging info field 808. The control info field 804 may be about 16 bits and may comprise a plurality of flag bits and/or may indicate the size (e.g., in bytes) of the tagging info field 808. For example, the control info field 804 may comprise about eight flag bits and eight bits of tagging information length. In an example embodiment, one or more of the flag bits (e.g., the top bit) may indicate to use a tag specified by the tagging info field 808 when the one or more flag bits are not set and may indicate to use a default tagging (e.g., a default tag from DefTag field 712 in FIG. 7) when the one or more flag bits are set. The AID field 806 may be about 16 bits and may be an identifier that is uniquely associated with a receiver and/or a peering relationship between a sender and the receiver. The tagging info field 808 may be about 32 bits and may carry a tag or label that may be inserted into a frame. The tag may comprise a VID, a priority indicator, or any other tag as would be appreciate by one of ordinary skill of the art upon viewing this disclosure. The tag carried in the tagging info field 808 may be inserted into a frame while being processed by a receiver. For example, the tag may be inserted just after a Destination address (DA)/Source address (SA) header and before the rest of the frame. Control block data 704 may be implemented as described FIG. 7.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as "comprises," "includes," and "having" should be understood to provide support for narrower terms such as "consisting of," "consisting essentially of," and "comprised substantially of." All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. In a network component, a method for processing a multi-destination frame, the method comprising:
receiving the multi-destination frame that comprises a control block type, a receiver list, and one or more data packets in a wireless radio network;
obtaining the control block type and the receiver list from the multi-destination frame; and
processing the multi-destination frame without discarding the multi-destination frame and using the control block type and the receiver list,
wherein the receiver list references the network component and a plurality of receivers, and
wherein the control block type is an include list and indicates a type of receiver list.

2. In a network component, a method for processing a multi-destination frame, the method comprising:
receiving the multi-destination frame that comprises a control block type, a receiver list, and one or more data packets in a wireless radio network;
obtaining the control block type and the receiver list from the multi-destination frame; and
processing the multi-destination frame by discarding the multi-destination frame and using the control block type and the receiver list,
wherein the receiver list references a plurality of receivers and does not reference the network component, and
wherein the control block type is an include list and indicates a type of receiver list.

3. In a network component, a method for processing a multi-destination frame, the method comprising:
receiving the multi-destination frame that comprises a control block type, a receiver list, and one or more data packets in a wireless radio network;
obtaining the control block type and the receiver list from the multi-destination frame; and
processing the multi-destination frame by discarding the multi-destination frame and using the control block type and the receiver list,
wherein the receiver list references the network component and a plurality of receivers, and wherein the control block tyre is an exclude list and indicates a type of receiver list.

4. In a network component, a method for processing a multi-destination frame, the method comprising:
receiving the multi-destination frame that comprises a control block type, a receiver list, and one or more data packets in a wireless radio network;
obtaining the control block type and the receiver list from the multi-destination frame; and
processing the multi-destination frame without discarding the multi-destination frame and using the control block type and the receiver list,
wherein the receiver list references a plurality of receivers and does not reference the network component, and
wherein the control block type is an exclude list and indicates a type of receiver list.

5. The method of claim 1, wherein the multi-destination frame further comprises a header that indicates the multi-destination frame is an aggregate frame.

6. The method of claim 1, wherein the multi-destination frame further comprises a header that indicates the multi-destination frame is not an aggregate frame.

7. The method of claim 1, wherein the control block type is indicated by setting one or more flag bits in a control block header within the multi-destination frame.

8. The method of claim 1, wherein the multi-destination frame further comprises tagging information.

9. The method of claim 8, wherein the tagging information is a virtual local area network (VLAN) identifier (VID).

10. The method of claim 9, further comprising generating a data packet comprising the tagging information, a destination address (DA), source address (SA) header, and one or more data frames.

11. A computer program product comprising computer executable instructions stored on a non-transitory computer readable medium that when executed by a processor causes a network device to perform the following:
   obtain a multi-destination frame that comprises a header, a control block, and a data payload using a wireless radio network connection;
   determine a control block type and a receiver list from the multi-destination frame; and
   process the multi-destination frame based on the control block type and the receiver list,
   wherein the control block type indicates that the receiver list is an include list or an exclude list, and
   wherein the receiver list references a plurality of receivers.

12. The computer program product of claim 11, wherein the computer executable instructions when executed by the processor cause the network device to:
   process the data payload within the multi-destination frame in response to the control block type indicating the receiver list is an include list and the receiver list comprises the network device; and
   drop the multi-destination frame in response to the control block type indicating the receiver list is an include list and the receiver list does not comprise the network device.

13. The computer program product of claim 11, wherein the computer executable instructions when executed by the processor cause the network device to:
   drop the multi-destination frame in response to the control block type indicating the receiver list is an exclude list and the receiver list comprises the network device; and
   process the data payload in response to the control block type indicating the receiver list is an exclude list and the receiver list does not comprise the network device.

14. The computer program product of claim 11, wherein the header indicates the multi-destination frame is an aggregate frame that comprises one or more data packets for the receivers.

15. The computer program product of claim 11, wherein the computer executable instructions when executed by the processor cause the network device to process the control block type to obtain tagging information.

16. The computer program product of claim 15, wherein the tagging information may be attached as a prefix to one or more data frames.

17. An apparatus comprising:
   a receiver configured to receive a data payload using a wireless radio link;
   a memory device;
   a processor coupled to the memory device and the receiver, wherein the memory comprises computer executable instructions stored in a non-transitory computer readable medium such that when executed by the processor causes the processor to generate a multi-destination frame that comprises a control block type, a receiver list associated with the control block type, a header, and the data payload; and
   a transmitter coupled to the processor, wherein the transmitter is configured to send the multi-destination frame,
   wherein the control block type indicates that the receiver list is an include list or an exclude list, and
   wherein the receiver list references a plurality of receivers.

18. The apparatus of claim 17, wherein further configured to attach tagging information associated with one or more receivers to the multi-destination frame, and wherein the tagging information is a virtual local area network (VLAN) identifier (VID).

19. The apparatus of claim 17, wherein the control block type is indicated by setting one or more flag bits in a control header within the multi-destination frame.

* * * * *